Nov. 1, 1938.    F. HERRLINGER    2,135,304
ELASTIC FLUID TURBINE PACKING
Filed June 16, 1936
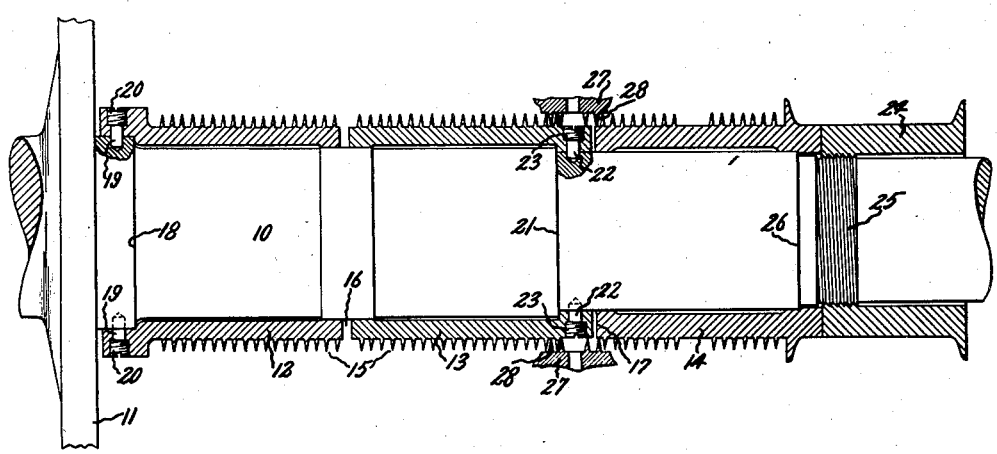
Inventor:
Fritz Herrlinger
by Harry E. Dunham
His Attorney.

Patented Nov. 1, 1938

2,135,304

UNITED STATES PATENT OFFICE 2,135,304

ELASTIC FLUID TURBINE PACKING

Fritz Herrlinger, Berlin-Charlottenburg, Germany, assignor to General Electric Company, a corporation of New York Application June 16, 1936, Serial No. 85,518
In Germany September 21, 1935

3 Claims. (Cl. 286—10)

The present invention relates to elastic fluid turbine packings of the labyrinth type, that is, to the kind of arrangement which usually includes an inner packing sleeve or element having circumferential teeth and being secured to the turbine shaft, and an outer packing element provided with teeth on an inner cylindrical surface and held on the turbine casing. The teeth of one packing element project into the grooves defined between adjacent teeth of the other packing element. Difficulties have been experienced with this type of packing elements when used in connection with high pressure, high temperature elastic fluid turbines because high pressures necessitate packing elements of considerable length, and high temperatures cause considerable expansion. The expansion determines the distance between adjacent teeth. The distance or spacing must be sufficient to prevent rubbing of the teeth of one element against those of the other element as the sleeves expand, taking into consideration that the sleeve secured to the turbine shaft, being subject to higher temperatures, expands more than the sleeve supported on the casing and furthermore, considering the fact that the expansion of the end portion of the sleeve facing the turbine is relatively greater than the expansion of the other end portion of the sleeve facing away from the turbine.

The object of my invention is to provide an improved construction and arrangement of labyrinth packings of the type described whereby the packing teeth may be closely spaced on the outer surface of the inner sleeve. This is accomplished in accordance with my invention by dividing the packing sleeves into a plurality of axially spaced elements or parts and providing means for securing one end portion of each element to the shaft, permitting free expansion of the other end portion and at the same time assuring uniform radial expansion of the elements.

For a better understanding of my invention, attention is directed to the following description and the claims appended thereto in connection with the accompanying drawing in which the single figure represents an elastic fluid turbine packing arrangement embodying my invention.

In the present instance, I have shown a solid type turbine rotor having a shaft 10 with a bucket wheel or disk 11 integrally united therewith. The packing arrangement according to my invention comprises in the present instance three sleeves 12, 13, and 14 having grooved outer surfaces to form teeth 15 thereon. The sleeves are axially spaced apart. The spacing designated with numeral 16 between the adjacent ends of the sleeves 12, 13 is greater than the spacing 17 between the adjacent ends of the sleeves 13, 14 because the sleeve 14 is subject to less expansion than the sleeve 12. The left-hand end of the sleeve 12 in the present example has a shouldered portion engaging a shoulder 18 formed on the shaft 10 secured thereto by means of a plurality, at least three, circumferentially uniformly spaced dowel pins 19. The dowel pins 19 are disposed in radial bores in the sleeve and the shaft and are prevented from radial outward movement by lock screws 20. Similarly, the right-hand end portion of the sleeve 13 forms a shoulder engaging a shoulder 21 formed on the shaft and this right-hand end portion of the packing sleeve 13 is secured to the shaft by a plurality of circumferentially, uniformly spaced dowel pins 22 held in position by lock screws 23. The right-hand end of the third sleeve 14 is secured to the shaft by means of a screw 24 engaging a threaded portion 25 of the shaft and forcing the right-hand portion of the packing sleeve 14 against a shoulder 26 on the shaft. The axial as well as the radial expansion of the sleeve 14 is considerably less than that of the other sleeves. Therefore no dowel pins or other means are provided with regard to the sleeve 14 to assure uniform, radial expansion. Such dowel pin arrangement, however, is necessary with regard to the sleeves 12 and 13 to maintain concentricity between the inner packing sleeves and the outer packing sleeves or elements. In the present instance, I have indicated an outer packing element 27 having teeth 28 projecting into the grooves formed by the packing teeth 15 of the inner elements. A subdivision of the outer packing sleeve into a plurality of axially spaced portions is in many cases not necessary because the outer packing sleeve is not subject to as high temperatures as the inner packing sleeve.

It will be readily understood that with this arrangement the spacing of the packing teeth of the outer sleeve and consequently also that of the inner sleeve must be at least equal to the maximum expansion of the sleeve 12 which is exposed to the highest temperature changes. But the spacing of the packing teeth may be much less than the maximum total expansion of the three axially spaced sleeves on the shaft because the expansion of one sleeve does not affect the expansion of the others.

What I claim as new and desire to secure by Letters Patent of the United States is:

1. A rotary shaft packing arrangement subject to great temperature changes during operation including the combination of a shaft, an inner packing element directly secured to the adjacent shaft portion, and an outer stationary packing element having an inner surface with packing teeth, said inner packing element comprising a plurality of axially spaced separate portions with packing grooves on their outer surfaces into which the packing teeth of the stationary packing element project, the separation of said portions preventing expansion of one portion from being transmitted to the other and thereby permitting relatively close spacing of the teeth and the grooves.

2. An elastic fluid turbine packing arrangement including the combination of a shaft having a free end, a plurality of axially spaced packing sleeves having grooved outer surfaces surrounding the shaft, means for directly connecting a portion of each packing sleeve to an adjacent shaft portion to assure uniform radial expansion of the entire sleeve and to permit free axial expansion of the other portions of the sleeves, the axial spacing between the sleeves decreasing towards the free end of the shaft, and an outer stationary packing element having an inner surface with packing teeth surrounding the packing sleeves with the packing teeth projecting into the grooves formed in the outer surface of the sleeves.

3. An elastic fluid turbine packing arrangement including the combination of a solid type turbine rotor having a shaft, a plurality of axially spaced packing sleeves having grooved outer surfaces surrounding the shaft, an outer stationary packing member forming a plurality of axially spaced annular teeth projecting into the grooves formed in the outer surfaces of the sleeves, and at least three circumferentially substantially uniformly spaced radial dowel pins for one end of each sleeve directly to secure said end to an adjacent portion of the shaft to permit free axial expansion of the other end and to assure uniform radial expansion of the sleeves.

FRITZ HERRLINGER.